(12) United States Patent
Kennie et al.

(10) Patent No.: US 9,429,090 B2
(45) Date of Patent: Aug. 30, 2016

(54) METHOD OF ESTIMATING CATALYST TEMPERATURE OF A MULTI-DISPLACEMENT INTERNAL COMBUSTION ENGINE

(75) Inventors: Gerald Lee Kennie, Marysville, MI (US); Kevin Scott Freeman, Lake Orion, MI (US); James J. Daley, Jackson, MI (US)

(73) Assignee: FCA US LLC, Auburn Hills, MI (US)

( * ) Notice: Subject to any disclaimer, the term of this patent is extended or adjusted under 35 U.S.C. 154(b) by 2583 days.

(21) Appl. No.: 12/132,685

(22) Filed: Jun. 4, 2008

(65) Prior Publication Data

US 2009/0301060 A1    Dec. 10, 2009

(51) Int. Cl.
| | |
|---|---|
| *F01N 11/00* | (2006.01) |
| *F02D 41/14* | (2006.01) |
| *F01N 9/00* | (2006.01) |
| *F02D 41/00* | (2006.01) |

(52) U.S. Cl.
CPC ............ *F02D 41/1446* (2013.01); *F01N 9/00* (2013.01); *F01N 9/005* (2013.01); *F02D 41/0082* (2013.01); *F02D 41/1443* (2013.01); *F01N 2430/02* (2013.01); *F01N 2900/1602* (2013.01); *Y02T 10/47* (2013.01)

(58) Field of Classification Search
USPC .................. 60/285, 286, 299; 73/114.75
See application file for complete search history.

(56) References Cited

U.S. PATENT DOCUMENTS

| | | | | |
|---|---|---|---|---|
| 5,303,168 A | * | 4/1994 | Cullen et al. ............... 700/299 |
| 5,956,941 A | * | 9/1999 | Cullen et al. ................. 60/274 |
| 6,044,643 A | * | 4/2000 | Ittner et al. .................... 60/289 |
| 6,155,043 A | * | 12/2000 | Zhang et al. ................ 60/284 |
| 6,209,313 B1 | * | 4/2001 | Wissler et al. ............... 60/274 |
| 6,295,806 B1 | | 10/2001 | Poublon et al. |
| 6,397,585 B2 | * | 6/2002 | Kitajima et al. ............. 60/284 |
| 6,415,601 B1 | | 7/2002 | Glugla et al. |
| 6,601,382 B2 | | 8/2003 | Nader et al. |
| 6,758,033 B2 | * | 7/2004 | Ueno et al. ................... 60/277 |
| 2002/0116917 A1 | * | 8/2002 | Glugla et al. ................ 60/285 |
| 2005/0229588 A1 | * | 10/2005 | Lewis et al. .................. 60/285 |
| 2005/0241298 A1 | * | 11/2005 | Bayerle et al. .............. 60/284 |
| 2005/0252199 A1 | * | 11/2005 | Arlt et al. ..................... 60/285 |
| 2007/0199305 A1 | | 8/2007 | Hoshi |
| 2007/0266696 A1 | * | 11/2007 | Kawakita et al. ............ 60/276 |

* cited by examiner

*Primary Examiner* — Jorge Leon, Jr.
(74) *Attorney, Agent, or Firm* — Ralph E. Smith

(57) ABSTRACT

A method of estimating temperature of a catalyst associated with a cylinder bank of a multi-displacement internal combustion engine having multiple cylinder banks associated with multiple catalysts. A temperature estimate of the catalysts associated with the multiple cylinder banks is set substantially equal to a base model temperature. Deactivation of a cylinder bank of the multiple cylinder banks is determined, and a catalyst cooldown correction is identified for the catalyst associated with the deactivated cylinder bank from a catalyst cooldown model including time elapsed since deactivation of the cylinder bank. The catalyst cooldown correction is applied to the temperature estimate of the catalyst associated with the deactivated cylinder bank to update the temperature estimate of the catalyst.

10 Claims, 3 Drawing Sheets

METHOD OF ESTIMATING CATALYST TEMPERATURE OF A MULTI-DISPLACEMENT INTERNAL COMBUSTION ENGINE

TECHNICAL FIELD

The present invention relates generally to anti-pollution treatment of exhaust gases of internal combustion engines.

BACKGROUND

An engine exhaust system typically includes catalytic converters in downstream fluid communication with exhaust manifolds to reduce pollutants from engine exhaust gases. Catalytic converter temperature is often used as an input variable to control engine operation and for government regulated On-Board Diagnostics (OBD). OBD measures include monitoring engine exhaust systems for various conditions that may cause undesirable increases in pollutant emissions.

One OBD measure involves periodic testing of oxygen ($O_2$) sensors in the exhaust system. The $O_2$ sensors are tested as a function of catalytic converter temperature, which is typically estimated. Such temperatures may not be reliably estimated for certain engine configurations such as variable displacement V-6 engines wherein an entire cylinder bank may be periodically deactivated and reactivated to conserve fuel. Exhaust gas temperatures from such a bank fluctuate greatly and existing temperature models may not reliably estimate temperatures of a catalytic converter downstream of such a cylinder bank.

SUMMARY

An implementation of a presently preferred method includes estimating temperature of a catalyst associated with a cylinder bank of a multi-displacement internal combustion engine having multiple cylinder banks associated with multiple catalysts. According to the method, a temperature estimate of the catalysts associated with the multiple cylinder banks is set substantially equal to a base model temperature. Deactivation of a cylinder bank of the multiple cylinder banks is determined, and a catalyst cooldown correction is identified for the catalyst associated with the deactivated cylinder bank from a catalyst cooldown model including time elapsed since deactivation of the cylinder bank. The catalyst cooldown correction is applied to the temperature estimate of the catalyst associated with the deactivated cylinder bank to update the temperature estimate of the catalyst.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
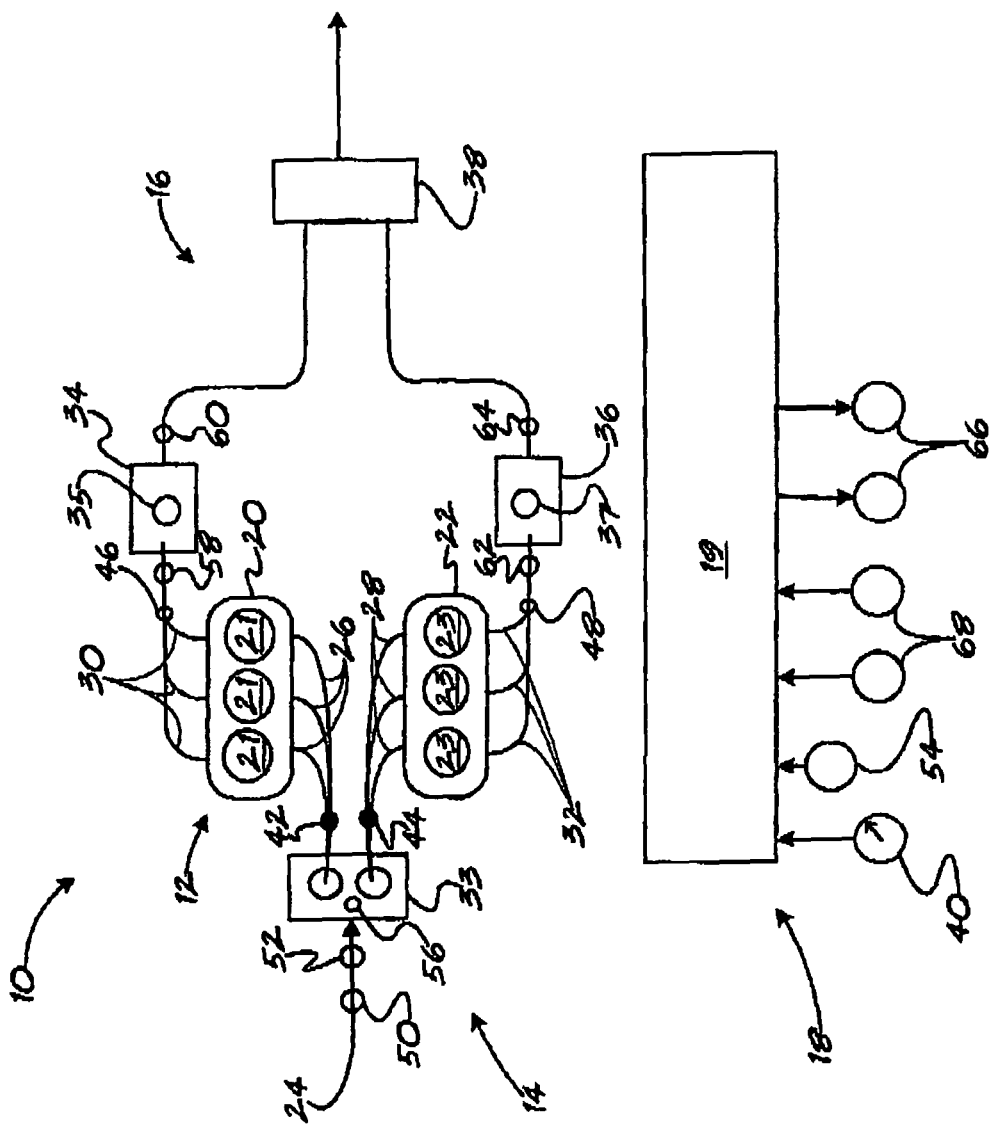
FIG. 1 is a schematic view of an exemplary embodiment of a multi-displacement internal combustion engine system.

An exemplary operating environment is illustrated in FIG. 1, and may be used to implement a presently disclosed method of estimating temperature of a catalyst associated with a cylinder bank of a multi-displacement internal combustion engine. The method may be carried out using any suitable system and, more specifically, may be carried out in conjunction with an engine system such as system 10. The following system description simply provides a brief overview of one exemplary engine system, but other systems and components not shown here could also support the presently disclosed method.

In general, the system 10 may include an internal combustion engine 12 that may combust a mixture of fuel and induction gases for conversion into mechanical rotational energy and exhaust gases, an engine breathing system that may include an induction system 14 to deliver induction gases to the engine 12, an exhaust system 16 to carry exhaust gases away from the engine 12, and an exhaust gas recirculation (EGR) system (not shown) to recirculate a portion of exhaust gases into the induction system 14. The system 10 may also include a fuel system (not shown) to provide any suitable liquid and/or gaseous fuel to the engine 12 for combustion therein with the induction gases, and a control system 18 to control operation of the engine system 10.

The internal combustion engine 12 may be any suitable type of engine, such as a spark-ignition engine like a gasoline engine, an autoignition or compression-ignition engine like a diesel engine, or the like. The engine 12 includes multiple cylinder banks 20, 22 with cylinders 21, 23 and pistons therein (not separately shown), which, along with a cylinder head (also not separately shown), may define combustion chambers (not shown) for internal combustion of a mixture of fuel and induction gases. The engine 12 may include any quantity of cylinders, and may be of any size and may operate according to any suitable speeds and loads. In any case, the engine 12 is a variable displacement or multi-displacement type of engine, wherein one or the other or both of the cylinder banks 20, 22 is a multi-displacement cylinder bank. A multi-displacement cylinder bank may be deactivated and reactivated in any suitable manner such as by controlling oil pressure to the valves/lifters, and/or ignition or fuel supply to the combustion chambers of the bank. In a specific example, the control system may deactivate spark plug and/or fuel injector operation in any suitable mariner to deactivate the bank, and may reactivate spark plug and fuel injector operation in any suitable manner to reactivate the bank.

The induction system 14 may include, in addition to suitable conduit and connectors, an air intake 24 to receive outside air, one or more intake manifolds 26, 28 for collecting the received air and/or EGR gases and distributing such induction gases to combustion chambers (not shown) of the engine 12, and one or more throttle valves 33 disposed between the air intake 24 and intake manifolds 26, 28 to control airflow into the intake manifolds 26, 28. The intake manifolds 26, 28 may be separate and may correspond to respective cylinder banks as shown, but may instead be integrated into a single manifold. The induction system 14 may also include any other suitable devices such as air filters, EGR valves, and/or the like (not shown).

The exhaust system 16 may include, in addition to suitable conduit and connectors, exhaust manifolds 30, 32 through which combustion exhaust gases flow from the engine 12, one or more catalytic converters 34, 36 each including one or more catalysts 35, 37 in downstream fluid communication with the exhaust manifolds 30, 32, and one or more downstream exhaust gas treatment devices 38 such as a muffler, one or more other catalytic converters, and/or the like. The exhaust system 16 may also include any other suitable devices such as EGR valves and the like (not shown).

Finally, the control system 18 may include any suitable hardware, software, and/or firmware to carry out at least some portions of the methods disclosed herein below, such as various engine system actuators and sensors. For example, an engine speed sensor 40 may measure the rotational speed of an engine crankshaft (not shown), and intake manifold sensors 42, 44 may measure pressure and/or mass flow of induction gases flowing into the engine combustion chambers. Although pressure and/or mass flow of exhaust gases flowing away from the combustion chambers may be modeled, the control system 18 may include exhaust manifold sensors 46, 48 to directly measure such pressure and/or mass flow if desired. In another example, an inlet air mass flow sensor 50 may measure incoming airflow in the induction system 14, and one or more temperature sensors 52, 54 may measure the temperature of induction gases flowing to the engine 12 and/or ambient temperature outside a vehicle carrying the engine system 10. The ambient temperature sensor 54 may be located in any suitable location in an engine compartment of the vehicle. A throttle position sensor 56 may measure the position of the throttle valve(s) 33. Also, oxygen ($O_2$) sensors 58, 60, 62, 64 may be placed in the exhaust system 16 upstream and/or downstream of the catalytic converters 34, 36 to measure oxygen in the exhaust gases.

All of the contemplated engine system sensors are not individually shown in the drawings but may include any suitable devices to monitor engine system parameters. In addition to the sensors shown, any other suitable actuators 66 and sensors 68 and their associated parameters may be encompassed by the presently disclosed system and methods. For example, the sensors may also include accelerator sensors, vehicle speed sensors, powertrain speed sensors, filter sensors, other flow sensors, vibration sensors, knock sensors, a tailpipe temperature sensor to measure the temperature of the exhaust gases exiting the exhaust system 16, and/or the like. In other words, any sensors may be used to sense any suitable physical parameters including electrical, mechanical, and chemical parameters. As used herein, the term sensor may include any suitable hardware and/or software used to sense any engine system parameter and/or various combinations of such parameters.

The control system 18 may further include one or more controllers 19 in communication with the actuators and sensors for receiving and processing sensor input and transmitting actuator output signals. For the sake of clarity, not all of the connections between the controller(s) 19 and the various sensors and actuators are shown. The controller(s) 19 may include one or more suitable processors and memory devices (not separately shown). The memory may be configured to provide storage of data and instructions that provide at least some of the functionality of the engine system 10 and that may be executed by the processor(s). For example, at least portions of the method may be enabled by one or more computer programs and various engine system data or instructions stored in memory as look-up tables, formulas, algorithms, maps, models, or the like. In any case, the control system 18 may control engine system parameters by receiving input signals from the sensors, executing instructions or algorithms in light of sensor input signals, and transmitting suitable output signals to the various actuators. The control system may also include any suitable communication bus(es) (not separately shown) to communicate between the various control system devices, input/output modules (not separately shown) that provide interfaces between the controller and memory and other components, a clock device (not separately shown), and any other suitable hardware and software to perform tasks of engine monitoring, diagnostics, and/or control.

The method of estimating temperature of a catalyst associated with a cylinder bank of a multi-displacement internal combustion engine may be at least partially carried out as one or more computer programs within the operating environment of the engine system 10 described above. Those skilled in the art will also recognize that a method according to any number of embodiments of the invention may be carried out using other engine systems within other operating environments.

Figure 2:
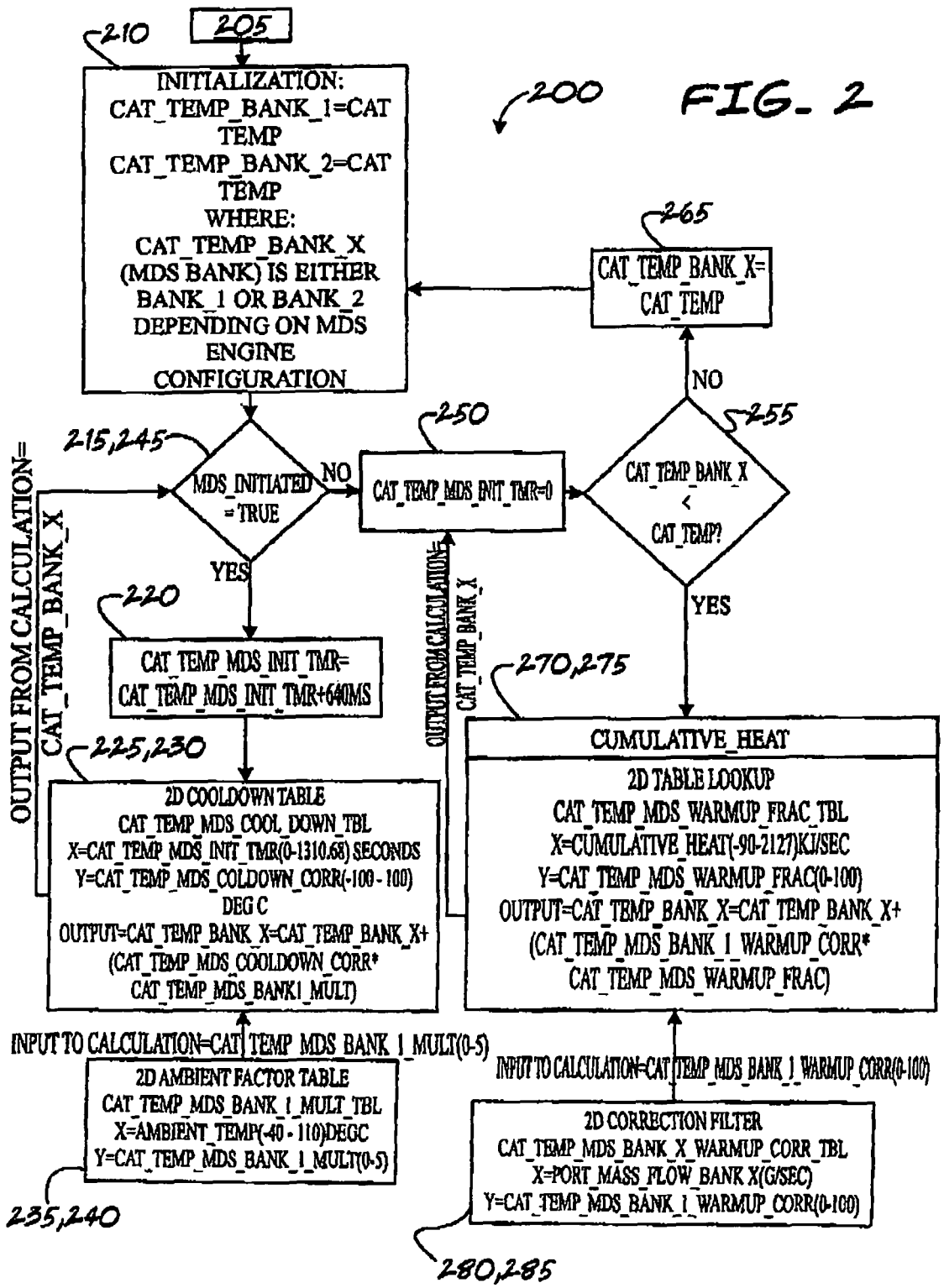
FIG. 2 is a flow chart of an exemplary embodiment of a method of estimating temperature of a catalyst associated with a multi-displacement cylinder bank of a multi-displacement internal combustion engine of the system of FIG. 1.

Referring now to FIG. 2, an exemplary method 200 is illustrated in flow chart form. As the description of the method 200 progresses, reference will be made to the engine system 10 of FIG. 1 and the signal plot of FIG. 3.

As shown at step 205, the method 200 may be initiated in any suitable manner. For example, the method 200 may be initiated at startup of the engine 12 of the engine system 10 of FIG. 1, or at any suitable time after engine startup.

At step 210, temperature estimates of catalysts associated with multiple cylinder banks may be set substantially equal to a base model temperature. As used herein, the terminology temperature estimate may include a single temperature value, multiple temperature values, one or more ranges of temperature values, or the like.

Multi-Displacement Systems (MDS) integrated into internal combustion engines with V-shaped cylinder bank configurations deactivate half the available cylinders in each of the opposed cylinder banks while in MDS mode. For example, in the case of a V8 MDS engine, an equal amount of cylinders per bank are deactivated to provide overall harmonic balance between the banks. If both banks are each in communication with downstream catalysts and catalytic converters, catalyst temperatures for both banks remain relatively equal for each bank due to substantially equal exhaust gas enthalpy. Such temperatures may be accurately determined using a standard catalyst temperature averaging model that may output base model temperature. One example of such a base model is disclosed in U.S. Pat. No. 6,295,806, which is assigned to the assignee hereof and is incorporated herein by reference in its entirety.

However, in the case of a V6 MDS engine, one entire bank is deactivated for harmonic balance and, thus, temperatures of downstream catalysts of the respective banks do not remain relatively equal due to unequal exhaust gas enthalpy. More specifically, the temperature of the catalyst associated with the deactivated bank—the MDS bank—will decrease after activation of MDS mode or deactivation of the MDS bank, and increase when MDS mode is deactivated and the MDS bank is reactivated. If the standard catalyst temperature averaging model is used to determine the temperatures of the catalysts associated with both banks while in MDS mode, the model will become inherently flawed due to an averaging nature of the model. Accordingly, OBD measures such as $O_2$ sensor evaluation cannot be carried out because such measures require reliable catalyst temperature estimates.

Figure 3:
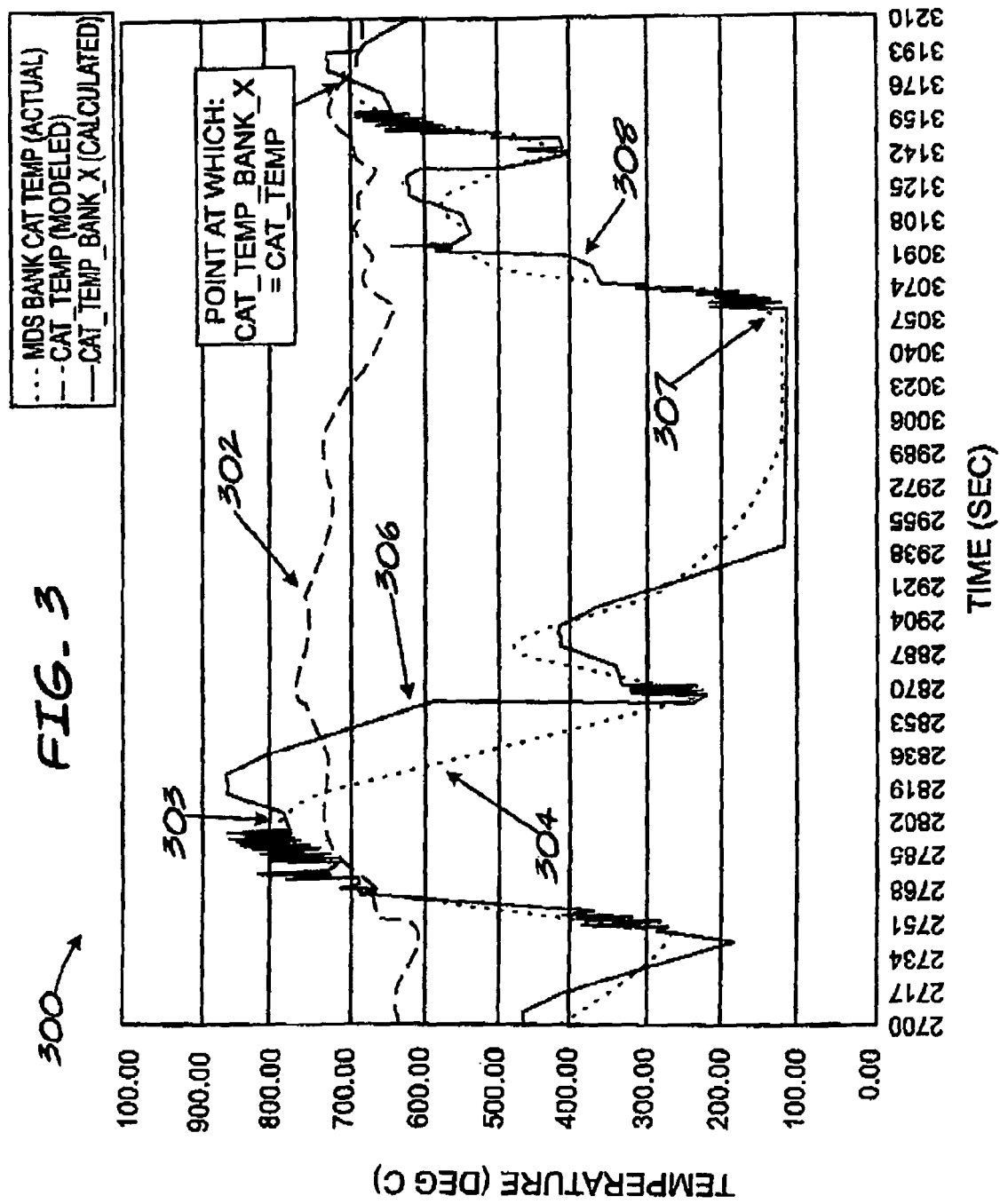
FIG. 3 is a graph illustrating various signal plots of catalyst temperature.

FIG. 3 illustrates a signal plot 300 including various exemplary traces of modeled, actual, and estimated temperatures of a catalyst as a function of time. The catalyst is associated with a cylinder bank that may be deactivated and reactivated according to an MDS mode. An exemplary base model temperature is represented by the signal trace enumerated 302 and is relatively uniform over the plot from about 600° C. to about 780° C.

At step 215, deactivation of a cylinder bank of multiple cylinder banks may be determined in any suitable manner. For example, the control system 18 may determine that parameters exist that may allow activation of the MDS mode, and based on this determination, the control system 18 may set forth an actual transition or activation to the MDS mode. During and/or after this transition, suitable feedback to and/or from the control system 18 will indicate that a multi-displacement cylinder bank has been deactivated. Once the MDS bank is deactivated, suitable sensors of the engine system 10 may be used to verify deactivation. For example, either one of the O₂ sensors (58, 60, or 62, 64) associated with the MDS bank 20 or 22 may be used to determine MDS bank deactivation based on activity. An exemplary deactivation of the MDS cylinder bank is represented by an inflection point 303 of a signal trace enumerated 304, which represents exemplary actual catalyst temperature that may be measured on a calibration or test engine equipped with thermocouples that measure catalyst temperature.

At step 220, a multi-displacement mode timer may be incremented. For example, the multi-displacement mode timer may be initiated in accordance with step 215, and then incremented by, for example, a cycle time of a control loop for the method 200 such as 640 ms or any other suitable engine monitoring cycle time.

At step 225, a catalyst cooldown correction may be identified for a catalyst associated with a deactivated cylinder bank from a catalyst cooldown model including time elapsed since deactivation of the cylinder bank as determined from a multi-displacement mode timer. As used herein, the term correction may include one or more of a value, range of values, multiplier, fraction, percentage, and/or the like. For example, the catalyst cooldown model may be a lookup table with an input variable of elapsed time since bank deactivation and an output variable of a cooldown correction value in degrees. Exemplary elapsed time may be on the order of 0 to 1,500 seconds, and exemplary cooldown correction values may be on the order of about −100 to about 100° C. The multi-displacement mode timer may be the timer incremented in step 220. After step 225, the method 200 may loop back to step 215.

At step 230, a catalyst cooldown correction may be applied to a temperature estimate of a catalyst associated with a deactivated cylinder bank to update the temperature estimate of the catalyst. For example, the catalyst cooldown correction value of step 225 may be applied to the estimated catalyst temperature of step 210. An exemplary updated temperature estimate for the catalyst associated with the deactivated cylinder bank is represented by a signal trace enumerated 306 in FIG. 3.

At step 235, an ambient temperature adjustment may be identified for a catalyst cooldown correction from an ambient temperature model including outside ambient temperature. For example, the ambient temperature model may be a lookup table with an input variable of ambient temperature and an output variable of an ambient temperature value in degrees. Ambient temperature may be directly sensed by a sensor such as one or both of the temperature sensors 52, 54 of the system 10. Exemplary ambient temperature values may be −40 to 110° C., and an exemplary ambient temperature adjustment may be a multiplication factor, such as from 0 to 5, wherein 0 may correspond to −40° C. and 5 may correspond to 110° C., wherein the relationship may or may not be linear or proportional.

At step 240, an ambient temperature adjustment may be applied to a catalyst cooldown correction to update a temperature estimate of a catalyst. For example, the ambient temperature adjustment of step 235 may be applied to the catalyst cooldown correction of step 225. Steps 225, 230, 235, and/or 240 may be combined into a single step using one or more lookup tables.

At step 245, reactivation of a cylinder bank may be determined. For example, the multi-displacement cylinder bank deactivated in step 215 may be determined to have been reactivated in any suitable manner. More specifically, the control system 18 may determine that parameters exist that may allow deactivation of the MDS mode, and based on this determination, the control system 18 may set forth an actual transition or deactivation of the MDS mode. During and/or after this transition, suitable feedback to and/or from the control system 18 may indicate that the MDS cylinder bank has been reactivated. Once the MDS bank is reactivated, suitable sensors of the engine system 10 may be used to verify this reactivation. For example, either one of the O₂ sensors 58, 60 or 62, 64 in the MDS bank 20 or 22 can be used to determine MDS bank reactivation based on activity. An exemplary reactivation of the deactivated cylinder bank is represented by an inflection point 307 of the signal trace enumerated 304.

At step 250, a multi-displacement mode timer may be reset. For example, the multi-displacement mode timer of step 220 may be reset to zero.

At step 255, a temperature estimate of a catalyst may be compared to a base model temperature for the catalyst. For example, the temperature estimate output from any of steps 210, 230, or 240 may be compared to the base model temperature from step 210.

At step 265, the temperature estimate of the catalyst may be set substantially equal to the base model temperature if the temperature estimate compared in step 255 is greater than the base model temperature. In that case, the method loops back to step 210 through step 265.

But if the temperature estimate compared in step 255 is less than the base model temperature, then the method may proceed to step 270.

At step 270, a catalyst warmup correction may be identified for a catalyst associated with a reactivated cylinder bank. Again, the term correction may include one or more of a value, range of values, multiplier, fraction, percentage, and/or the like. For example, the catalyst warmup correction may be identified from a catalyst warmup model including cumulative heat associated with the reactivated cylinder bank. In particular, the catalyst warmup model may be a lookup table with an input variable of cumulative heat for the reactivated cylinder bank and an output variable of a warm up fraction from, for example, 0 to 100%. Exemplary cumulative heat values may range from −90 to 2200 KJ/sec. Cumulative heat may be determined in accordance with the formulas below or in any other suitable manner.

$$\dot{H} = \dot{m}_e h_e, \quad \text{(Eq. 1)}$$

where $$\dot{m}_e(\text{kg/sec}) = \frac{[\text{MASS\_FLOW\_BANK\_REACTIVATE}(g/\text{sec})]}{[1000\,(g/\text{kg})]}, \quad \text{(Eq. 2)}$$

and $$h_e(\text{kJ/kg}) = -22.546 + 1.0655 \times \text{CAT\_TEMP} + 0.0001441 \times \text{CAT\_TEMP}^2, \quad \text{(Eq. 3)}$$

so that $$\text{Cumulative Heat} = \sum_{t_1}^{t_2} \dot{H}. \quad \text{(Eq. 4)}$$

MASS_FLOW_BANK_REACTIVATED may be any mass flow parameter associated with the reactivated cylinder bank such as mass flow into or out of the cylinder bank, or a differential therebetween. In one example, any one or more of the sensors 42, 44, 46, 48 of the system of FIG. 1, or modeled mass flow, may be used to provide the mass flow parameter value. CAT_TEMP may be the base model temperature of step 210. Cumulative heat may include heat energy applied relative to a given mass flow over time, which may be considered every software loop interval, or considered at other times such as second by second.

At step 275, a catalyst warmup correction may be applied to a temperature estimate of a catalyst associated with a reactivated cylinder bank to update the temperature estimate of the catalyst. For example, the catalyst warmup correction of step 270 may be applied to the estimated catalyst temperature of steps 230 and/or 240. An exemplary updated temperature estimate for the catalyst associated with the reactivated cylinder bank is represented by a signal trace enumerated 308 of FIG. 3.

At step 280, a mass flow adjustment may be identified for the catalyst warmup correction from a mass flow model including mass flow associated with the reactivated cylinder bank. Again, mass flow may be any mass flow parameter associated with the reactivated cylinder bank such as mass flow into or out of the cylinder bank, or a differential therebetween that may be sensed by sensors 42, 44, 46, 48 of the system of FIG. 1, or via modeled mass flow.

At step 285, the mass flow adjustment may be applied to the catalyst warmup correction to update the temperature estimate of the catalyst.

At any suitable time during the method 200, the temperature estimate of the catalyst may be used as an input variable to determine whether to conduct on-board diagnostics of an exhaust system oxygen sensor. For instance, diagnostics may be used to observe activity of voltage readings from an $O_2$ sensor, and determine the quality of that $O_2$ sensor. In an example of $O_2$ sensor monitoring, the $O_2$ sensor activity is quantified by the summation of all absolute changes between two $O_2$ voltage readings (e.g. High and Low) from consecutive samplings within a calibratable amount of time. The $O_2$ sensor quality is extracted from these activities. In order to achieve a consistent result, a diagnostic may be triggered when an engine is running at or within certain manifold absolute pressure or speed (MAP or RPM) windows, when airflow is relatively stable, steady $O_2$ control is applied, and/or catalytic converter temperatures are at or above certain desired thresholds. If the diagnostic is triggered without these consistent parameters being accomplished, the diagnostic may consider it a non-passing test and fail the $O_2$ sensor. In the present system 10, if one or more of the catalysts 35, 37 has not reached a proper temperature threshold as determined by the present method, an $O_2$ diagnostic may not be conducted until that threshold has been determined to be within the parameters of the consistency.

As used herein, the term "model" may include any construct that represents something using variables, such as a look up table, map, formula, algorithm and/or the like. Models may be application specific and particular to the exact design and performance specifications of any given engine system.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A method of estimating temperature of a catalyst associated with a cylinder bank of a multi-displacement internal combustion engine having multiple cylinder banks associated with multiple catalysts, comprising:
   setting a temperature estimate of the catalysts associated with the multiple cylinder banks substantially equal to a base model temperature;
   determining deactivation of a cylinder bank of the multiple cylinder banks;
   identifying a catalyst cooldown correction for the catalyst associated with the deactivated cylinder bank from a catalyst cooldown model including time elapsed since deactivation of the cylinder bank; and
   applying the catalyst cooldown correction to the temperature estimate of the catalyst associated with the deactivated cylinder bank to update the temperature estimate of the catalyst,
   wherein determining deactivation of the cylinder bank includes identifying that the cylinder bank has been deactivated while a different cylinder bank is still operating in accordance with multi-displacement operation.

2. The method of claim 1 wherein the catalyst cooldown model includes a lookup table.

3. The method of claim 1, further comprising:
   identifying an ambient temperature adjustment for the catalyst cooldown correction from an ambient temperature model including outside ambient temperature; and
   applying the ambient temperature adjustment to the catalyst cooldown correction to update the temperature estimate of the catalyst.

4. The method of claim 3 wherein the ambient temperature model includes a lookup table.

5. The method of claim 3 wherein the outside ambient temperature is sensed using a temperature sensor.

6. The method of claim 1, further comprising:
   determining reactivation of the deactivated cylinder bank;
   comparing the temperature estimate of the catalyst to the base model temperature for the catalyst;
   using the base model temperature if the temperature estimate is greater than the base model temperature; and
   if the temperature estimate is less than the base model temperature,
   identifying a catalyst warmup correction for the catalyst from a catalyst warmup model including cumulative heat associated with the cylinder bank, and
   applying the catalyst warmup correction to the temperature estimate of the catalyst to update the temperature estimate of the catalyst.

7. The method of claim 6, further comprising:
   incrementing a multi-displacement mode timer after determining deactivation of the cylinder bank; and
   resetting the multi-displacement mode timer after determining reactivation of the cylinder bank.

8. The method of claim 6, further comprising:
   identifying a mass flow adjustment for the catalyst warmup correction from a mass flow model including mass flow associated with the reactivated cylinder bank; and
   applying the mass flow adjustment to the catalyst warmup correction to update the temperature estimate of the catalyst.

9. The method of claim 1, further comprising incrementing a multi-displacement mode timer after determining deactivation of the cylinder bank.

10. A method of estimating temperature of a catalyst associated with a cylinder bank of a multi-displacement internal combustion engine having multiple cylinder banks associated with multiple catalysts, comprising:
 a) setting temperature estimates of the catalysts associated with the multiple cylinder banks substantially equal to a base model temperature;
 b) determining deactivation of a cylinder bank of the multiple cylinder banks;
 c) incrementing a multi-displacement mode timer;
 d) identifying a catalyst cooldown correction for the catalyst associated with the deactivated cylinder bank from a catalyst cooldown model including time elapsed since deactivation of the cylinder bank as determined from the incremented multi-displacement mode timer;
 e) applying the catalyst cooldown correction to the temperature estimate of the catalyst associated with the deactivated cylinder bank to update the temperature estimate of the catalyst;
 f) identifying an ambient temperature adjustment for the catalyst cooldown correction from an ambient temperature model including outside ambient temperature;
 g) applying the ambient temperature adjustment to the catalyst cooldown correction to update the temperature estimate of the catalyst;
 h) determining reactivation of the cylinder bank;
 i) resetting the multi-displacement mode timer;
 j) comparing the temperature estimate of the catalyst to the base model temperature for the catalyst;
 k) using the base model temperature if the temperature estimate is greater than the base model temperature;
 l) but if the temperature estimate is less than the base model temperature,
  l1) identifying a catalyst warmup correction for the catalyst associated with the reactivated cylinder bank from a catalyst warmup model including cumulative heat associated with the cylinder bank, and
  l2) applying the catalyst warmup correction to the temperature estimate of the catalyst to update the temperature estimate of the catalyst;
 m) identifying a mass flow adjustment for the catalyst warmup correction from a mass flow model including mass flow associated with the reactivated cylinder bank;
 n) applying the mass flow adjustment to the catalyst warmup correction to update the temperature estimate of the catalyst; and
 o) using the temperature estimate of the catalyst as an input variable to determine whether to conduct on-board diagnostics of an exhaust system oxygen sensor.

* * * * *